United States Patent
Patronas et al.

(10) Patent No.: US 12,323,750 B2
(45) Date of Patent: Jun. 3, 2025

(54) DISTRIBUTED OPTICAL CIRCUIT ALLOCATION IN OPTICAL DATA-CENTER NETWORKS (ODCN)

(71) Applicants: MELLANOX TECHNOLOGIES, LTD., Yokneam (IL); YISSUM RESEARCH DEVELOPMENT COMPANY OF THE HEBREW UNIVERSITY LTD., Jerusalem (IL)

(72) Inventors: Ioannis (Giannis) Patronas, Piraeus (GR); Eitan Zahavi, Zichron Yaakov (IL); Paraskevas Bakopoulos, Ilion (GR); Michael Schapira, Modi'in (IL); Elad Mentovich, Tel Aviv (IL)

(73) Assignee: Mellanox Technologies, Ltd, Yokenam (IL)

( * ) Notice: Subject to any disclaimer, the term of this patent is extended or adjusted under 35 U.S.C. 154(b) by 0 days.

(21) Appl. No.: 17/766,740

(22) PCT Filed: Nov. 5, 2019

(86) PCT No.: PCT/GR2019/000077
§ 371 (c)(1),
(2) Date: Apr. 6, 2022

(87) PCT Pub. No.: WO2021/090033
PCT Pub. Date: May 14, 2021

(65) Prior Publication Data
US 2024/0107206 A1    Mar. 28, 2024

(51) Int. Cl.
*H04Q 11/00*    (2006.01)
(52) U.S. Cl.
CPC ..... *H04Q 11/0062* (2013.01); *H04Q 11/0005* (2013.01); *H04Q 2011/0086* (2013.01)

(58) Field of Classification Search
CPC ........... H04Q 11/0062; H04Q 11/0005; H04Q 2011/0086
See application file for complete search history.

(56) References Cited

U.S. PATENT DOCUMENTS

| 5,850,398 A | 12/1998 | King, Jr. |
| 5,905,587 A | 5/1999 | Maeno et al. |

(Continued)

FOREIGN PATENT DOCUMENTS

| EP | 2306664 A1 | 4/2011 |

OTHER PUBLICATIONS

Bakopoulos et al., "Nephele: An end-to-end scalable and dynamically reconfigurable optical architecture for application-aware sdn cloud data centers", IEEE Communications Magazine, vol. 56, No. 2, pp. 178-188, Feb. 2018.

(Continued)

*Primary Examiner* — Pranesh K Barua
(74) *Attorney, Agent, or Firm* — Meitar Patents Ltd.; Daniel Kligler

(57) ABSTRACT

A method for distributed allocation of data paths in an optical network (100) including optical switches (30, 32, 130) connected by optical links (44, 140), includes receiving a request for a data path for connecting a source node (10) and a destination node (20). In in response to the request, one or more queries are sent, the queries corresponding to one or more candidate optical circuits that connect the source node and the destination node, the queries requesting one or more processors (230) to configure the optical switches along the candidate optical circuits to reserve optical channels on the optical links of the candidate optical circuits for the requested data path. An optical circuit is identified from among the candidate optical circuits, in which all the optical channels for the requested data path (Continued)

have been reserved successfully. The requested data path is established over the identified optical circuit.

16 Claims, 3 Drawing Sheets

(56) References Cited

U.S. PATENT DOCUMENTS

| | | | |
|---|---|---|---|
| 6,101,013 | A | 8/2000 | Monacos |
| 6,738,354 | B1* | 5/2004 | Ashwood Smith ..... H04L 45/50 370/409 |
| 7,167,480 | B1 | 1/2007 | Somashekhar |
| 7,860,392 | B2* | 12/2010 | Hoang ................... H04L 45/12 398/57 |
| 8,774,232 | B2 | 7/2014 | Smith et al. |
| 9,430,437 | B1 | 8/2016 | Krishnan et al. |
| 9,602,434 | B1 | 3/2017 | Saleh |
| 9,925,492 | B2 | 3/2018 | Raikin et al. |
| 10,200,144 | B1 | 2/2019 | Chowdhury et al. |
| 11,368,768 | B2 | 6/2022 | Bakopoulos et al. |
| 2002/0018264 | A1* | 2/2002 | Kodialam ............... H04L 45/62 398/47 |
| 2002/0124104 | A1 | 9/2002 | Rappaport et al. |
| 2002/0126343 | A1* | 9/2002 | Fumagalli .......... H04J 14/0228 398/59 |
| 2002/0141400 | A1 | 10/2002 | DeMartino |
| 2003/0026297 | A1* | 2/2003 | Nagarajan .......... H04Q 11/0062 370/535 |
| 2003/0187914 | A1 | 10/2003 | Kaniyar et al. |
| 2003/0198227 | A1* | 10/2003 | Matsuura ................ H04L 47/70 370/395.2 |
| 2004/0120261 | A1 | 6/2004 | Ovadia et al. |
| 2005/0232144 | A1* | 10/2005 | Doverspike ......... H04J 14/0227 370/216 |
| 2008/0008189 | A1 | 1/2008 | Verma et al. |
| 2012/0106955 | A1 | 5/2012 | Le Rouzic et al. |
| 2013/0103777 | A1 | 4/2013 | Kagan et al. |
| 2014/0019663 | A1 | 1/2014 | Ishii et al. |
| 2014/0314417 | A1 | 10/2014 | Leigh et al. |
| 2015/0098466 | A1 | 4/2015 | Haramaty et al. |
| 2015/0104171 | A1 | 4/2015 | Hu et al. |
| 2015/0189409 | A1* | 7/2015 | He ...................... H04J 14/0269 398/49 |
| 2016/0134375 | A1 | 5/2016 | Kakande |
| 2016/0294715 | A1 | 10/2016 | Raindel et al. |
| 2016/0359758 | A1 | 12/2016 | Shpiner et al. |
| 2017/0093699 | A1 | 3/2017 | Crupnicoff et al. |
| 2018/0070157 | A1 | 3/2018 | Menard et al. |
| 2018/0234473 | A1 | 8/2018 | Levi et al. |
| 2020/0177525 | A1 | 6/2020 | Morris |

OTHER PUBLICATIONS

Farrington et al., "Helios: A hybrid electrical/optical switch architecture for modular data centers", Proceedings of the ACM SIGCOMM 2010 Conference, New York, pp. 339-350, year 2010.

Benzaoui et al., "Cboss: bringing traffic engineering inside data center networks", IEEE/OSA Journal of Optical Communications and Networking, vol. 10, No. 7, pp. 117-125, Jul. 2018.

Wang et al., "c-through: part-time optics in data centers", SIGCOMM Computer Communication Review, vol. 41, No. 4, pp. 327-338, Aug. 2010.

Mellette et al., "Rotornet: A scalable, low-complexity, optical datacenter network", Proceedings of the Conference of the ACM Special Interest Group on Data Communication, New York, USA, pp. 267-280, year 2017.

Valadarsky et al., "Xpander: Unveiling the secrets of high-performance datacenters", Proceedings of the 14th ACM Workshop on Hot Topics in Networks, pp. 1-7, year 2015.

International Application # PCT/GR2019/000077 Search Report dated May 25, 2020.

Liu et al., "Scheduling Techniques for Hybrid Circuit/Packet Networks", Proceedings of the 11th ACM Conference on Emerging Networking Experiments and Technologies, New York, USA, pp. 1-13, year 2015.

Liu et al., "Better Algorithms for Hybrid Circuit and Packet Switching in Data Centers", arXiv:1712.06634v, pp. 1-26 Dec. 20, 2017.

* cited by examiner

DISTRIBUTED OPTICAL CIRCUIT ALLOCATION IN OPTICAL DATA-CENTER NETWORKS (ODCN)

FIELD OF THE INVENTION

The present invention relates generally to communication networks employing optical links, and particularly to allocation of communication paths in such networks.

BACKGROUND OF THE INVENTION

Management of traffic in communication networks employing optical data links has been previously discussed in the patent literature. For example, U.S. Patent Application Publication 2008/0008189 describes a method for enhancing the carrying capacity of a network, comprising the steps of detecting the level of traffic incident on the network, and reserving, dynamically, wavelengths for a class of traffic according to the level of traffic incident on the network. The network can be a dense wavelength division multiplexing optical network. In an embodiment, the method includes reserving wavelengths for a plurality of source-destination node-pairs, receiving a connection request for a connection between one of the source-destination node-pairs, searching for an available wavelength among the group of reserved wavelengths for traffic between the source and destination nodes, and connecting the source and destination nodes utilizing the available wavelength.

As another example, EU Patent Application Publication EP2306664 describes a method for configuring an all optical network as a function of traffic requests comprising the following steps (a) selecting a transparent multi-point to multi-point path comprising (i) a collection of wavelength switching nodes interconnected by a collection of optical links, and (ii) a wavelength channel available throughout the transparent path, (b) selecting a collection of traffic requests according to the wavelength channel capacity, said traffic requests corresponding to the transmission of a packet stream between two end nodes belonging to the collection of wavelength switching nodes along the transparent path, and (c) configuring the wavelength switching nodes to transmit and receive packet streams corresponding to the set of traffic requests.

U.S. Pat. No. 8,774,232 describes systems and methods for making latency measurements and using these measurements in routing in optical networks. In an exemplary embodiment, a method is defined whereby two nodes sharing a line automatically determine whether both nodes are capable of making a latency measurement and then which node will initiate and which node participates in making the latency measurement. Latency and latency variation of customer circuits are measured using an in-band, non-intrusive calculation with a high-degree of accuracy. These calculations may be considered for circuit routing based on the latency and circuit acceptance based on maximum latency restrictions.

SUMMARY OF THE INVENTION

An embodiment of the present invention provides a method for distributed allocation of data paths in an optical network including optical switches connected by optical links, the method includes receiving a request for a data path for connecting a source node and a destination node. In in response to the request, one or more queries are sent, the queries corresponding to one or more candidate optical circuits that connect the source node and the destination node, the queries requesting one or more processors to configure the optical switches along the candidate optical circuits to reserve optical channels on the optical links of the candidate optical circuits for the requested data path. An optical circuit is identified from among the candidate optical circuits, in which all the optical channels for the requested data path have been reserved successfully. The requested data path is established over the identified optical circuit.

In some embodiments, the source node and the destination node include nodes of a data center.

In some embodiments, sending the multiple queries includes choosing the candidate optical circuits as a partial subset of a total collection of possible optical circuits that connect the source node and the destination node.

In an embodiment, choosing the partial subset includes choosing only the candidate optical circuits that have less than a prespecified number of optical switches in series between the source node and the destination node.

In another embodiment, the method further includes, in each processor receiving a query relating to a candidate optical circuit: (a) checking whether the requested optical channel is available, (b) if the requested optical channel is available, the requested optical channel is secured for the data path, and the query is forwarded to a subsequent processor associated with the candidate optical circuit. If the requested optical channel is unavailable, the entire candidate optical circuit is disqualified.

In some embodiments, sending the multiple queries includes initiating sending of the queries in a processor associated with an optical switch connected directly to the source node, and forwarding the queries to subsequent processors associated with subsequent optical switches on the candidate optical circuits en route to the destination node.

In some embodiments, sending the multiple queries includes initiating sending of the queries in a processor associated with an optical switch connected directly to the destination node, and backwarding the queries to preceding processors associated with preceding optical switches on the candidate optical circuits en route to the source node.

There is additionally provided, in accordance with an embodiment of the present invention, an optical network, the network including a plurality of optical switches and multiple processors. The plurality of optical switches is connected by optical links. The multiple processors associated with the optical switches are operative to: (a) receive a request for a data path for connecting a source node and a destination node, (b) in response to the request, send one or more queries corresponding to one or more candidate optical circuits that connect the source node and the destination node, the queries requesting one or more of the processors to configure the optical switches along the candidate optical circuits to reserve optical channels on the optical links of the candidate optical circuits for the requested data path, (c) identify, from among the candidate optical circuits, an optical circuit in which all the optical channels for the requested data path have been reserved successfully, and (d) establish the requested data path over the identified optical circuit.

The present invention will be more fully understood from the following detailed description of the embodiments thereof, taken together with the drawings in which:

DETAILED DESCRIPTION OF EMBODIMENTS

Overview

Figure 1:
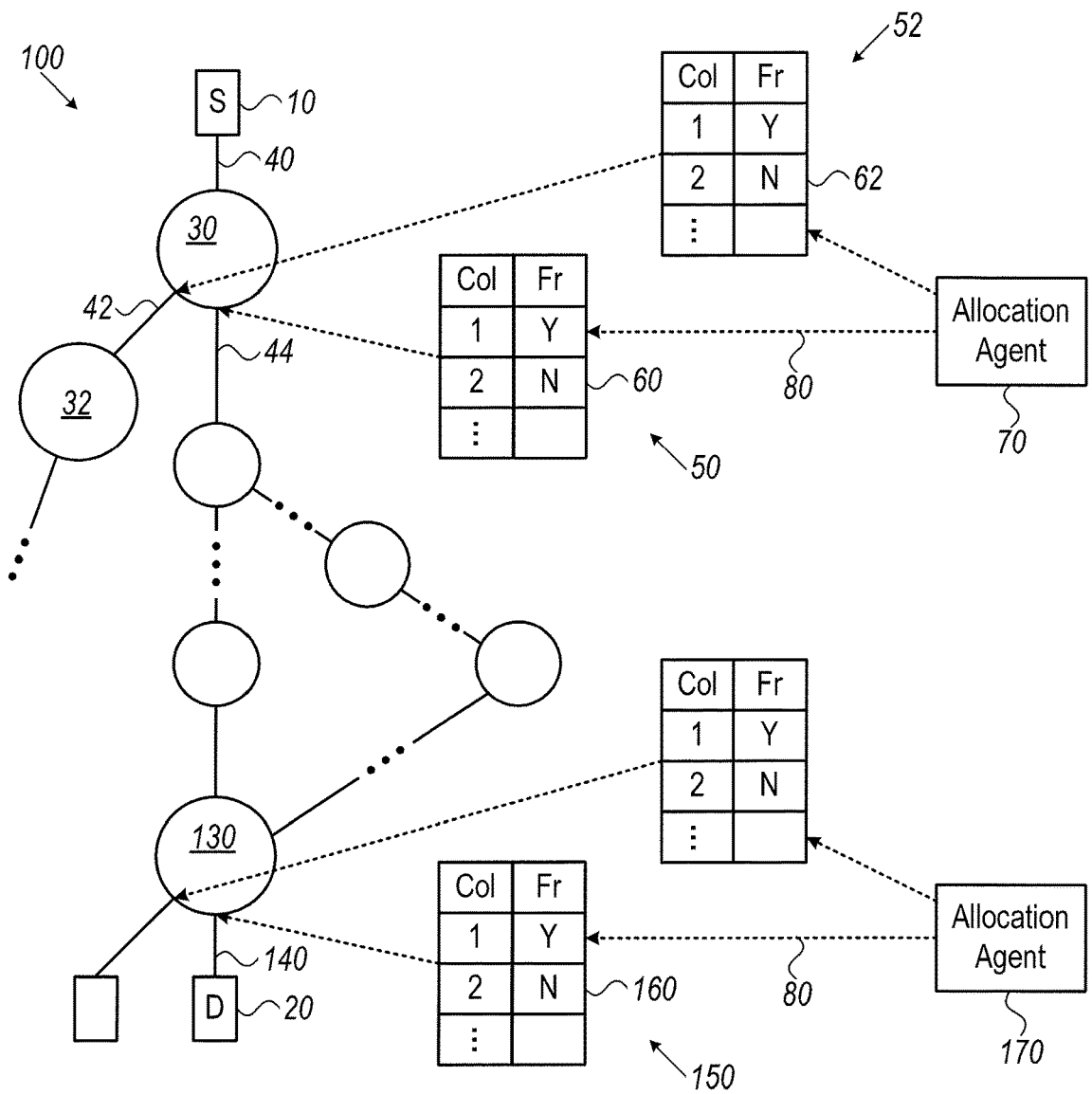
FIG. 1 is a schematic block diagram of an optical network comprising source and destination nodes and a data path between them, in accordance with an embodiment of the present invention.

Optical Data Center Networks (ODCN) and optical networks in general often rely on allocation and deallocation of light paths from data sources to destinations to guarantee that no light collisions and data loss occur in the network. Traditionally, the allocation algorithms are run from a central entity which considers the entire demand for data paths and attempts to find the densest mapping of these demands onto network resources (e.g., optical circuits of the network) over single or multiple time periods.

A typical optical network comprises multiple optical switches that are connected to one another by optical links, typically comprising optical fibers. The description that follows refers to optical fibers, for clarity, but the disclosed techniques can be applied with other suitable types of optical links. The optical network provides communication services to endpoints, also referred to as nodes.

On a given fiber that connects a pair of switches, the switches may transmit and receive data over one or more optical channels. Each optical channel is characterized by some optical characteristic that distinguishes it from other optical channels and enables independent transfer of data, e.g., wavelength (color), timeslot, optical propagation mode or polarization.

In the context of the present disclosure and in the claims, the term "optical circuit" refers to a path through the network that traverses one or more optical switches and one or more optical links (e.g., fibers). An optical circuit may serve as a data path between a source node and a destination node, and therefore the terms "optical circuit" and "data path" are sometimes used interchangeably herein. Any two optical switches connected directly by an optical link are also called hereinafter a "node-pair."

A possible approach for optical circuit allocation may utilize either online or offline algorithms that consider the entirety of network resources and its usage, to try to optimize the allocated circuits so as to maximize the number of allocated circuits. The optimization target thus comes with a complexity penalty and is too slow to deal with high rates of requests per second. Moreover, the fact that the algorithm needs to consider the entire set of demands and resources makes it a bottleneck in collecting the demands, calculating the allocations, and sending its resulting configuration commands to the network switches and hosts.

For example, an algorithm used to allocate optical circuits, named "Solstice," obtains a complete traffic-demand matrix containing the current amount of data to be sent between every source and destination pair. It then performs multiple allocation iterations, starting from the largest entries, until all demands are resolved. Each iteration involves some matrix preparation operations followed by a maximal cardinality matching algorithm. The overall complexity of the algorithm is $O(N^2 \log 2(N))$. It was shown that for dense demand matrices, the runtime of Solstice for N>64 can be significantly longer than one msec.

Embodiments of the present invention that are described hereinafter provide methods and systems for allocation of optical circuits in an optical network, such as in a. ODCN. The disclosed techniques allow for a completely distributed allocation of optical circuits. Some embodiments utilize a large number of software entities, named hereafter allocation agents (AA). Each AA is responsible for managing a small number of network resources, e.g., the resources associated with a respective optical switch. Consequently, the disclosed technique offers a scalable solution that avoids a central bottleneck, and its latency grows in a sub-logarithmic manner with network size.

As noted above, different optical channels on a given optical link may be distinguished from one another by various optical characteristics such as timeslot, wavelength (color), optical propagation mode or polarization. For simplicity, the current description uses color as a differentiator. The disclosed techniques, however, can be used with any other suitable types of optical channels. The optical characteristic of an optical channel is thus also referred to herein as "wide-sense color."

Consequently, an optical circuit from a source node to a destination node does not only specify a set of optical links (e.g., fibers) along the path from the source node to the destination node, but also the optical channel (wide-sense color) used on each optical links. A circuit allocation technique should thus track the allocation of each optical channel on each of the used optical links. Some optical networks may impose a restriction whereby the optical channel has to be kept constant along the entire optical circuit, while in other networks the optical channel may change. Such restrictions mostly depend on the capability of the optical switches to modify light characteristics as it passes through.

Embodiments of the disclosed invention exploit the fact that optical links often have considerable over-capacity, to maintain scalability (e.g., independent availability of at least one light path) at the cost of less-perfect utilization of redundant network resources (e.g., optical channel). In some embodiments, a system is provided that has an over-provisioning of network bandwidth and thus avoids the need for complex algorithms to allocate optical circuits in the densest way. Once an attempt at achieving maximal density is given up, distributed allocation algorithms can be utilized, such as the example processes disclosed below, to completely remove any need for central computation or a central database.

In an embodiment, a method to allocate optical communication capacity in an optical network comprising nodes of a data center, or an optical network of data centers is provided, which includes (a) receiving a request for a data path for connecting a source node and a destination node, (b) in response to the request, sending one or more queries corresponding to one or more candidate optical circuits that connect the source node and the destination node, the queries requesting one or more of the processors to configure the optical switches along the candidate optical circuits to reserve optical channels on the optical links of the candidate optical circuits for the requested data path, (c) identifying, from among the candidate optical circuits, an optical circuit in which all the processors have successfully reserved the optical channels for the requested data path, and (d) establishing the requested data path over the identified optical circuit.

The request to set up the data path may be received, for example, over a control network that connects the AAs. In the context of the present invention, a "control network" that connects the AAs is a logical network by which the AAs communicate with one another. This logical network is used, for example, for sending queries, requests, deallocation instructions, etc. Logically, the control network is independent of the optical circuits established between the optical switches. Physically, the logical network may use any suitable physical media, e.g., a separate data network, or the same fibers used for the optical network.

In the disclosed techniques, each request for a data path is independently checked, and a path is provided based on the available capacity rather than by attempting repeated re-optimization of network resources. By using such a scalable approach, the disclosed embodiments of the present invention enable faster allocation times (e.g., sub millisecond), lower latencies, smaller buffers, and the ability to serve much smaller data flows (in terms of their total data size). The disclosed techniques may therefore enable better utilization of optical circuit switching in an ODCN.

Distributed Optical Circuit Allocation in ODCN

FIG. 1 is a schematic block diagram of an optical network 100 comprising a source node 10 and a destination node 20 and a data path between them, in accordance with an embodiment of the present invention. Network 100 provides optical communication bandwidth in each optical link between two switches, using different optical channels, for example, by using different wavelengths with a same optical link, such as using O-band wavelengths. As noted above, any two switches connected directly by an optical link are also called hereinafter a "node-pair." The number of optical links connecting source 10 to destination 30 in series is also termed hereinafter "number of hops."

Different paths between source 10 and destination 30 may exist in network 100, each path made of a given number of hops. In some embodiments, a maximal number of allowed hops is prespecified, such that candidate paths made of number of hops that exceed this number are excluded from the path list. A number M of hops is defined by M+1 optical switches having M optical links between in series.

In the shown embodiment, and by way of example, a plurality of optical switches 30, . . . , 130 are connected by a respective plurality of optical links 44, . . . , 140 on a path between source 10 to destination 20. Each optical switch (e.g., switches 30 and 130 and others in between) has a processor (such as a processor 230 of switch 30, shown in FIG. 2), that runs an allocation agent (AA) attached to the switch (e.g., processor 230 runs AA 70, and another processor runs AA 170, etc.)

In general, the switch and the "processor" are typically different devices but may be placed in the same package. An interface is provided between the processor and the optical switch, for controlling the optical switch. The requests travel through the control network and, if the process of allocating resources is successful, the optical path is established and the optical switches are configured accordingly.

As denoted by arrows 80, the processor runs the AA to check if there are available optical channels in each of a set of optical links connected to optical ports of the respective switch (e.g., using AA 70 processor 230 would allocate optical channels over links 44 and 42, etc.), to enable each switch to connect with other switches as requested.

To perform the above allocation task, each optical link is associated with an allocation table with a "free" bit for each optical channel s. For example, optical link 44 is associated with an allocation table 50 with "free" bit 60 per each optical channel, and optical link 140 is associated with an allocation table 150 with "free" bit 160 per each optical channel.

In the shown example, processor 230 runs AA 70 to also manage different optical links of optical switch 30 to different switches, such as managing optical link 42 to switch 32, with optical channels of link 42 associated with an allocation table 52 with "free" bit 62 per each optical channel.

Typically, as noted above, each request to connect a source to a destination generates a list of candidate data paths, that involve different switches along each candidate data path between source 10 and destination 20. In an embodiment, the possible data paths are precalculated, for example by a processor of the source node, and shared to all the network nodes (e.g., next AA, destination node, etc.). In the described example, the processor of the source node lists these paths in a message (shown in FIG. 3) it sends to the next AA. The processor chooses the best paths (in the example, K paths with less hops). Further on, each AA checks the availability of resources for the next AA along a path that is denoted in the message. In an embodiment, the message from the source node does not include the full path but includes the destination node. Each AA checks its memory for paths to the destination and decides which of them will be the next hop AA: shorter messages but a little more processing effort in each AA and need for the AA storing all the paths instead of just the next hops info.

The processor of each switch runs the respective AA of the switch to track available optical channels, to guarantee that a pre-allocated resource is not reused, so that a collective agreement can be made regarding a first available path between source 10 and destination 20.

In some embodiments, other algorithms can be used, e.g., for Quality of Service, security, to avoid congestion or to take into account latency instead of just looking the number of hops. Also, the list of possible paths could change during the operation of the network to respond to link failures, congestion etc. The nodes are typically notified to refresh their lists of paths.

For example, consider a configuration generated by an algorithm named herein "Constant Color First Out K Paths (CCFKP)." In the disclosed CCFKP algorithm, a random set of K paths has pre-calculated color pairs from every source to every destination, assuming that the wide-sense color is fixed along the path. The calculated set is then distributed to each source. Any attempt to assign a low-hop count path is limited to a number smaller than K. However, due to the built-in redundancy in color capacity, the probability of it resulting in too high latency is negligible.

In some of the disclosed methods, when a source node requests to send traffic to a destination node, a processor of the source node identifies and sends the information about identified (e.g., precomputed) candidate data paths, from the source to the destination, to the AA managing the first switch on these paths (assuming there is only one such AA (e.g., AA 70), though a request can be split to multiple groups if there are more). The allocation agent (e.g., AA 70) inspects the availability of optical channels at the first hop of the path and prunes out non-free optical links between the switch to which it is attached (e.g., switch 30) to other switches connected to the switch (e.g., switch 30) by an optical link. For the available links the AA clears the "free" bit of the optical link to indicate that the resource (e.g., optical channels) was requested, and sends the appropriate configuration command to the managed switch. The allocation agent of the switch then splits the original request it received and sends it forward to one or more next-hop allocation agents. This operation is performed by each AA along each possible data path, and when an AA receives an indication that a path is already taken it notifies the preceding AAs to free that previously consumed optical channel.

When the last AA along a path has marked the usage of the optical link's optical channel, it notifies source node 10 that the path to destination node 30 is available.

The source node can then utilize the path, and if there are further path notifications received, it sends a "clear" request along these paths to free the unused allocated optical channels.

The network configuration shown in FIG. 1 is chosen purely for the sake of conceptual clarity. Any other configuration can be used in alternative embodiments. Elements that are not mandatory for understanding the disclosed techniques, such as optoelectronic and electronic devices, are omitted from the figure for simplicity of presentation. While in the shown example checking availability is performed by allocation agents sending queries forward to one or more next-hop allocation agents starting from the source node, other querying architectures are possible, such as, for example, checking availability by allocation agents sending queries backwards to one or more preceding-hop allocation agents, starting from the destination node.

In some embodiments, allocation agents 70 are implemented in programmable processors, which are programmed in software to carry out the functions described herein. In the context of the present disclosure, a "Processor" could be a general-purpose processor, ASIC, FPGA etc. Typically, the device that runs the AA is an electrical switch with specialized processing capabilities.

The software may be downloaded to the processors in electronic form, over a network, for example, or it may, alternatively or additionally, be provided and/or stored on non-transitory tangible media, such as magnetic, optical, or electronic memory.

Figure 2:
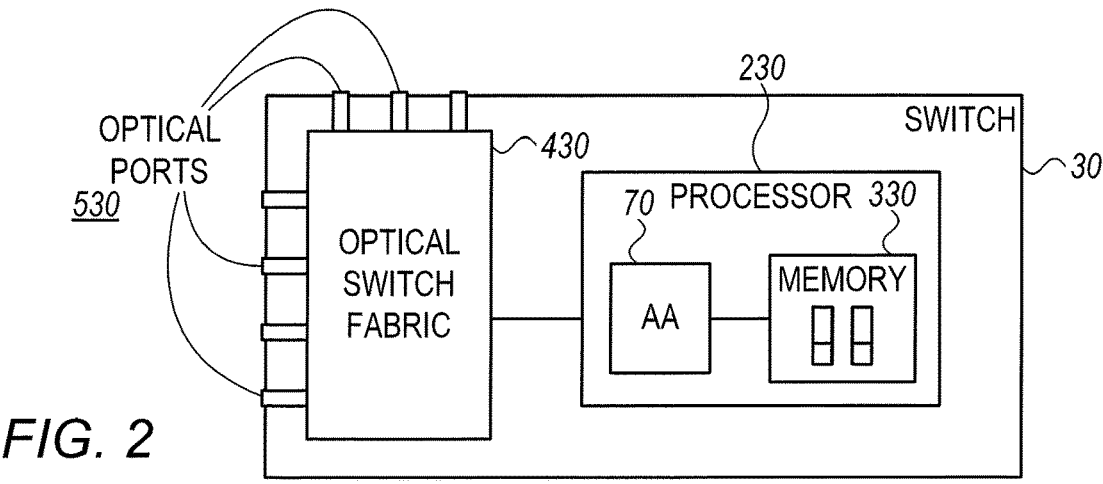
FIG. 2 is a schematic block diagram of an optical switch of the optical network of FIG. 1, in accordance with an embodiment of the present invention.

FIG. 2 is a schematic block diagram of an optical switch of the optical network of FIG. 1, in accordance with an embodiment of the present invention. The shown switch is referred to as switch 30, however the disclosed schematic switch structure generally holds to any switch of optical network 100. In particular, in some cases, the optical switch and the "processor" may or may not be incorporated in one device.

As seen, switch 30 comprises a processor 230 that runs AA 70 and uses a memory 330 to, for example, track channel availability in a candidate data path. Processor 230 controls an optical switch fabric 430 connected to multiple optical ports 530, each coupled to an optical link (some optical links are shown in FIG. 1) to connect switch 30 with another switch of network 100 using an optical channel allocation protocol such as described in FIG. 3.

Figures 3, 4:
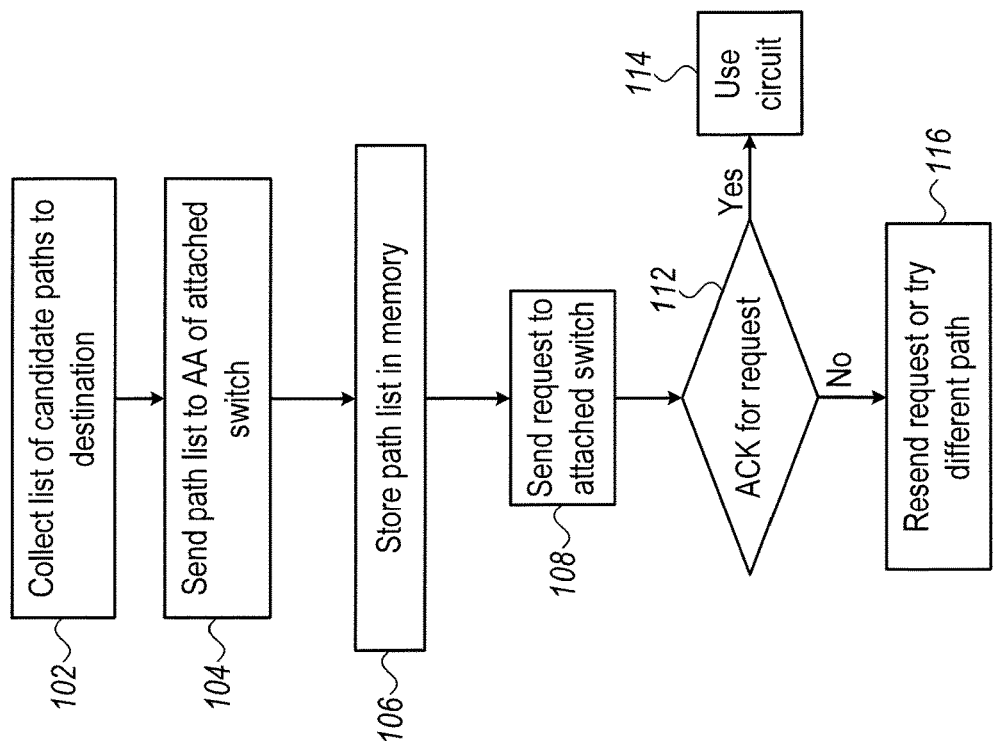
FIG. 3 is an example of messages in a form of a table sent between allocation agents (AA) of switches of the network of FIG. 1, in accordance with an embodiment of the present invention.
FIG. 4 is a flow chart that schematically illustrates a method for requesting a data path that connects between the source and destination nodes of FIG. 1, and acknowledging (ACK) the request, in accordance with an embodiment of the present invention.

FIG. 3 is an example of messages in a form of a table 55 sent between allocation agents (AA) of switches of the network of FIG. 1, in accordance with an embodiment of the present invention.

As shown, table 55 comprises a "command" line and a table of paths. Each path is represented by a HopCount pointer, Number of Hops, and a table of "Allocation Agent Addresses," "Output Port Number," and "Color" for each hop. The disclosed technique assumes that at least one of the paths shown in table 55 will have a complete set of hops available, typically several. This assumption is supported by the redundancy in colors (i.e., optical channels) that characterizes network 100.

FIG. 4 is a flow chart that schematically illustrates a method for requesting a data path that connects between source node 10 and destination node 30 of FIG. 1, and acknowledging (ACK) the request, in accordance with an embodiment of the present invention. The algorithm carried by a processor of source node 10 for asking for an available optical channel on an optical link is depicted in steps 102-108 and for receiving ACK is shown by steps 112-116. Additionally or alternatively, other processing elements, such as processor 230 of switch 30, may perform the actions.

The process begins with source node 10 collecting a set of candidate ODCN paths to destination 20, at a paths collection step 102. Typically, the candidate paths are only a partial subset of the total collection of possible paths that connect source node 10 and destination node 20. Source node 10 may select the subset of candidate paths using any suitable criterion, e.g., select a predefined number, K, of paths at random.

Next, source node 10 sends the collected paths to allocation agent 70 of the switch attached to source 10, at a path sending step 104. At an accessing preparation step 106, source node 10 stores the identity of the collected paths in a memory, so that the source node can filter and sort the requested paths when receiving a reply to queries sent to other allocation agents of the ODCN network. At a querying step 108, source node 10 sends AA 70 a query to check if there is an available optical channel on any optical links from switch 30 to other switches on the candidate data paths.

Typically, steps 112, 114,116 are performed at the end of the allocation process at the source node: Either (112) if all requests to the AAs of the path are successful (114) or if there was a failure on allocating the required resources, in which case the source sends the request again or tries a different path (116).

Figure 5:
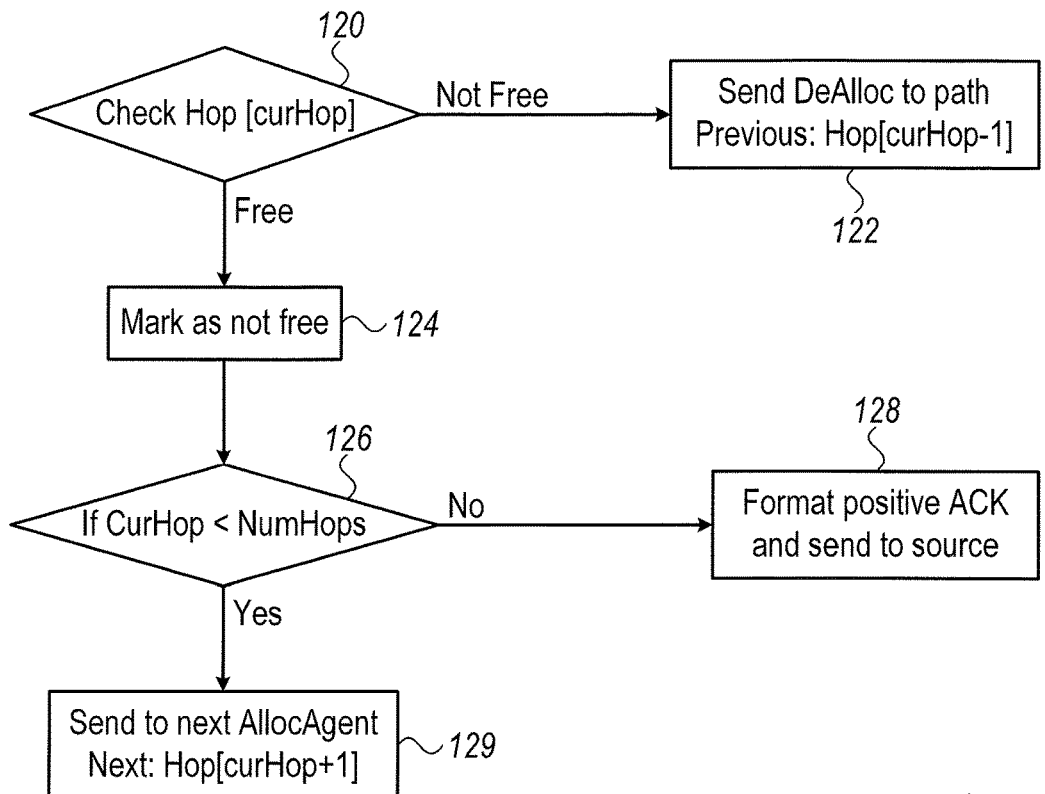
FIG. 5 is a flow chart that schematically illustrates a method of checking for an available optical circuit to connect a node-pair of the network of FIG. 1, in accordance with an embodiment of the present invention.

FIG. 5 is flow chart that schematically illustrates a method of checking for an available optical circuit to connect a node-pair of the network of FIG. 1, in accordance with an embodiment of the present invention. The checking is performed by an AA of one of the switches of the node pair that receives a query. The process begins at a checking step 120, when the AA checks if the switch to which the AA is attached has an available optical channel to output the communication to the other switch of the node-pair.

If the AA has no available optical channel, the AA then sends a "DeAlloc" message to the AA that sent the query, at a signaling an optical link (i.e., a hop) is not free step 122. If the AA allocates a path with an available optical channel, the AA marks the path as not free for subsequent queries, at a marking path step 124. If, at a hop counting step 126, the counting found that a last hop was allocated (i.e., a "No" answer to the question), then the AA sends a positive ACK to the source node (e.g., source 10), that a path to destination (e.g., destination 30) has been established. If the answer to the question is that the hop is an intermediate one, the AA sends (e.g., forwards) the query to one or more next AAs, at a continue querying step 129.

Figure 6:
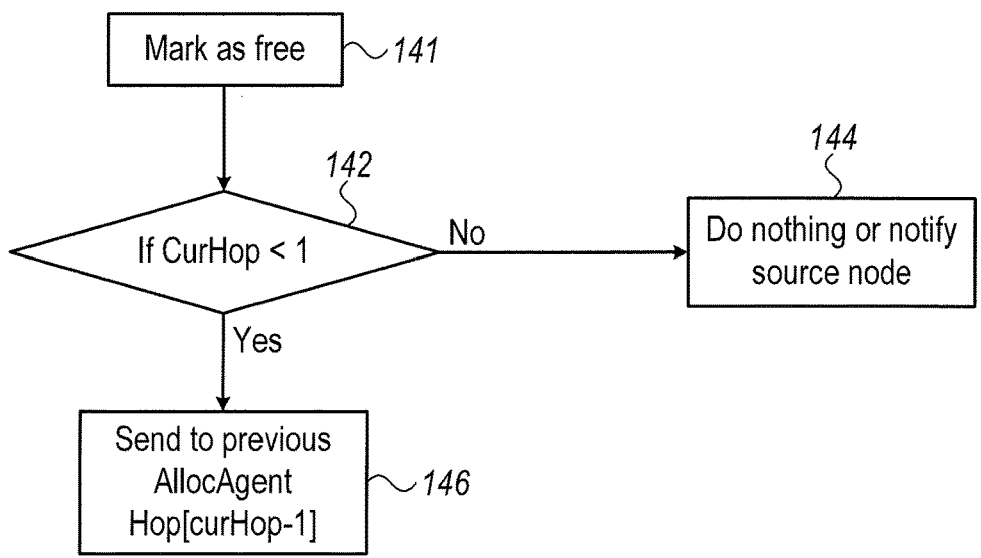
FIG. 6 is a flow chart that schematically illustrates a method for responding to the query in FIG. 5, in accordance with an embodiment of the present invention.

FIG. 6 is a flow chart that schematically illustrates a method for responding to the query 122 in FIG. 5, in accordance with an embodiment of the present invention. As seen, an AA previous in line (in series towards the source) marks a respective resource as "free," at a pair-node optical channels assigning step 141.

In the case that the processors search multiple candidate optical paths in parallel, multiple paths may successfully find the requested resources from the source to the destination. Thus, there should exist a mechanism for deallocating the resources from the optical paths that were not selected for the transmission. This mechanism can be realized, for example, with timers on the AAs or by transmitting deallocation messages from the source to AAs on the paths that were not selected.

If the AA in series is in fact the first one on a path from the source (answering "No" to the question in box 142), it performs, action step 144. If the AA has a preceding AA from which it received a query (i.e., a "yes" answer to the question in box 142), then the AA sends to the preceding AA an acknowledgment of the available hop, at a hop acknowledgment step, 146. Alternatively, before forwarding the DeAlloc message to the previous AA of the path, the current AA could check for a different path (than the one that was rejected).

Although the embodiments described herein mainly address control of transmission of high data rates in communication systems employing optical links, the methods and systems described herein can also be used in other applications, such as in ad-hoc wireless networks.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for distributed allocation of data paths in an optical network comprising optical switches connected by optical links, the method comprising:
   in a plurality of processors distributed across the optical network, maintaining a plurality of allocation tables for each optical switch among at least some of the optical switches, wherein each allocation table (i) is associated with a respective optical link connected to the optical switch, and (ii) specifies availability of optical channels on the optical link;
   receiving a request for a data path for connecting a source node and a destination node;
   in response to the request, determining one or more candidate optical circuits that connect the source node and the destination node;
   sending one or more queries along the one or more candidate optical circuits, the one or more queries (i) specifying the candidate optical circuits and (ii) requesting one or more of the processors to configure the optical switches along the candidate optical circuits to allocate optical channels on the optical links of the candidate optical circuits for the requested data path;
   in response to the queries, checking the allocation tables by the processors to determine the availability of the optical channels on the optical links of the candidate optical circuits, and pruning one or more of the optical links on which the optical channels are unavailable, thereby identifying, from among the candidate optical circuits, an optical circuit in which all the optical channels for the requested data path have been allocated successfully;
   establishing the requested data path over the identified optical circuit; and
   deallocating one or more allocated optical channels that do not belong to the identified optical circuit.

2. The method according to claim 1, wherein the source node and the destination node comprise nodes of a data center.

3. The method according to claim 1, wherein sending the one or more queries comprises choosing the candidate optical circuits as a partial subset of a total collection of possible optical circuits that connect the source node and the destination node.

4. The method according to claim 3, wherein choosing the partial subset comprises choosing only the candidate optical circuits that have less than a prespecified number of optical switches in series between the source node and the destination node.

5. The method according to claim 1, and comprising, in each processor receiving a query among the one or more queries, relating to a candidate optical circuit among the one or more candidate optical circuits:
   checking whether a requested optical channel, requested in the query, is available;
   if the requested optical channel is available, reserving the requested optical channel for the data path, and forwarding the query to a subsequent processor associated with the candidate optical circuit; and
   if the requested optical channel is unavailable, disqualifying the entire candidate optical circuit.

6. The method according to claim 1, wherein sending the one or more queries comprises initiating sending of the one or more queries in a processor associated with an optical switch connected directly to the source node, and forwarding the one or more queries to subsequent processors associated with subsequent optical switches on the candidate optical circuits en route to the destination node.

7. The method according to claim 1, wherein sending the one or more queries comprises initiating sending of the one or more queries in a processor associated with an optical switch connected directly to the destination node, and backwarding the one or more queries to preceding processors associated with preceding optical switches on the candidate optical circuits en route to the source node.

8. The method according to claim 1, wherein maintaining the plurality of allocation tables distributed across the optical network comprises refraining from maintaining a centralized database specifying allocation of optical channels.

9. An optical network, the network comprising:
   a plurality of optical switches connected by optical links; and
   multiple processors distributed across the optical network and associated with the optical switches, wherein the processors are to:
      maintain a plurality of allocation tables for each optical switch among at least some of the optical switches, wherein each allocation table (i) is associated with a respective optical link connected to the optical switch, and (ii) specifies availability of optical channels on the optical link;
      receive a request for a data path for connecting a source node and a destination node;

in response to the request, determine one or more candidate optical circuits that connect the source node and the destination node;

send one or more queries along the one or more candidate optical circuits, the one or more queries (i) specifying the candidate optical circuits and (ii) requesting one or more of the processors to configure the optical switches along the candidate optical circuits to allocate optical channels on the optical links of the candidate optical circuits for the requested data path;

in response to the queries, check the allocation tables to determine the availability of the optical channels on the optical links of the candidate optical circuits, and prune one or more of the optical links on which the optical channels are unavailable, thereby identifying, from among the candidate optical circuits, an optical circuit in which all the optical channels for the requested data path have been allocated successfully;

establish the requested data path over the identified optical circuit; and deallocate or more allocated optical channels that do not belong to the identified optical circuit.

10. The optical network according to claim 9, wherein the source node and the destination node comprise nodes of a data center.

11. The optical network according to claim 9, wherein the multiple processors are to choose the candidate optical circuits as a partial subset of a total collection of possible optical circuits that connect the source node and the destination node.

12. The optical network according to claim 11, wherein the multiple processors are to choose the partial subset by choosing only the candidate optical circuits that have less than a prespecified number of optical switches in series between the source node and the destination node.

13. The optical network according to claim 9, wherein the multiple processors are further to, upon receiving a query among the one or more queries, relating to a candidate optical circuit among the one or more candidate optical circuits:

check whether a requested optical channel, requested in the query, is available;

if the requested optical channel is available, reserve the requested optical channel for the data path, and forward the query to a subsequent optical switch on the candidate optical circuit; and if the requested optical channel is unavailable, disqualify the entire candidate optical circuit.

14. The optical network according to claim 9, wherein a processor among the multiple processor, which is associated with an optical switch connected directly to the source node, is to initiate sending of the one or more queries, and to forward the one or more queries to subsequent ones of the processors associated with subsequent optical switches on the candidate optical circuits en route to the destination node.

15. The optical network according to claim 9, wherein a processor among the multiple processor, which is associated with an optical switch connected directly to the destination node, is to initiate sending of the one or more queries, and to backward the one or more queries to preceding ones of the processors associated with preceding optical switches on the candidate optical circuits en route to the source node.

16. The optical network according to claim 9, wherein, in maintaining the plurality of allocation tables distributed across the optical network, the processors are to refrain from maintaining a centralized database specifying allocation of optical channels.

* * * * *